J. A. CUMMINS.
SHAPING MACHINE.
APPLICATION FILED MAY 16, 1914.
1,113,201.
Patented Oct. 13, 1914.
4 SHEETS—SHEET 1.
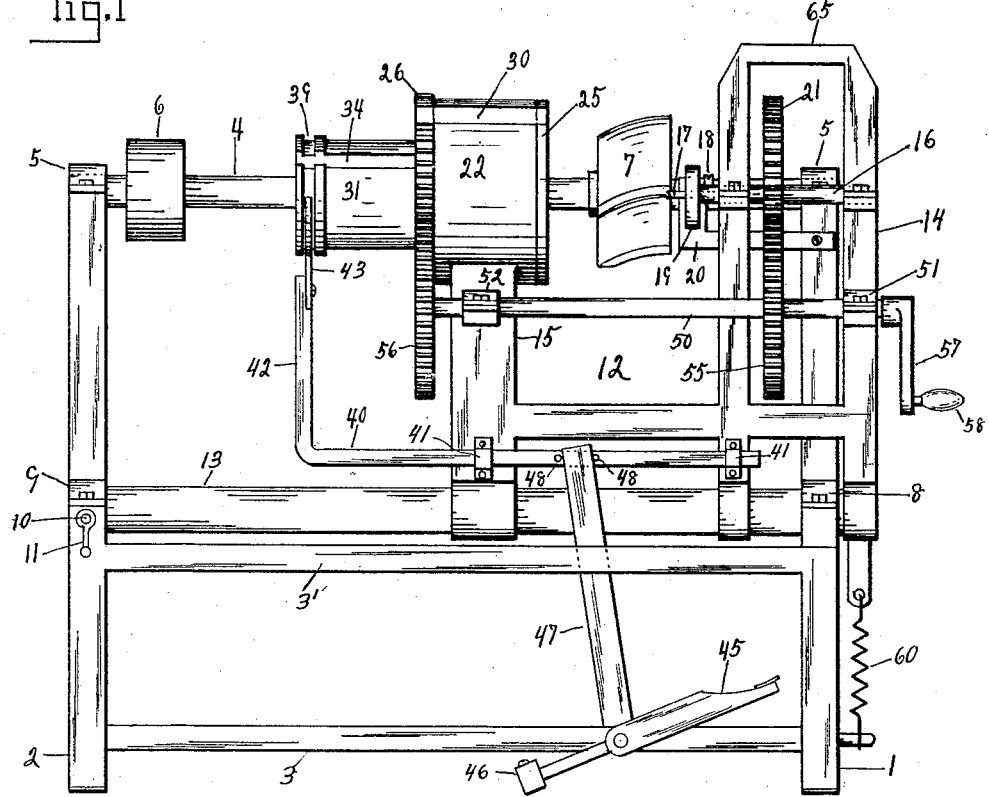
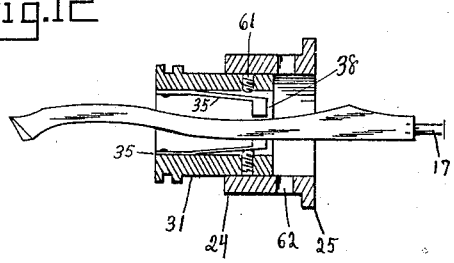
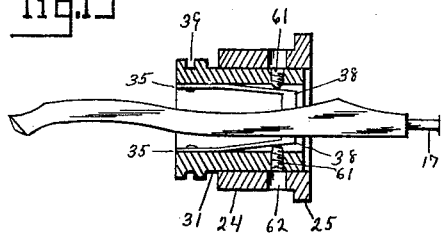
WITNESSES:
INVENTOR.
James A. Cummins.
BY
W. B. Munnell.
ATTORNEY.

J. A. CUMMINS.
SHAPING MACHINE.
APPLICATION FILED MAY 16, 1914.
1,113,201.
Patented Oct. 13, 1914.
4 SHEETS—SHEET 2.
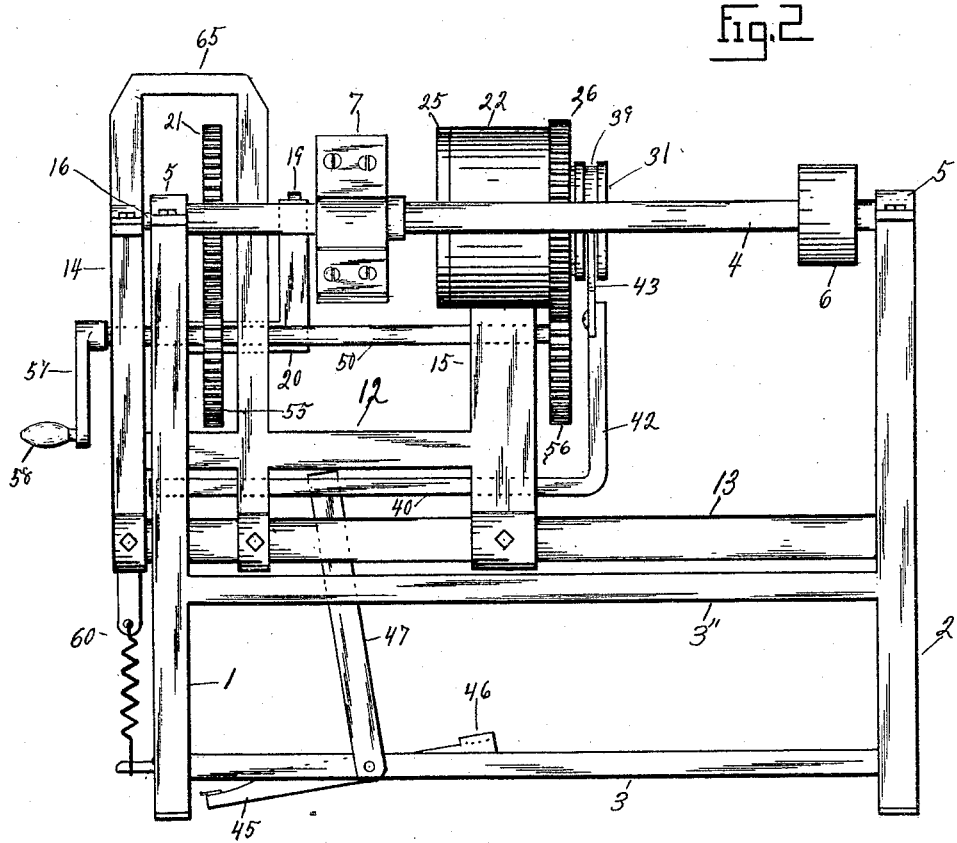
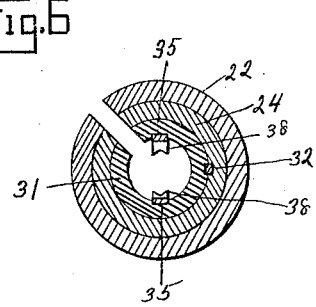
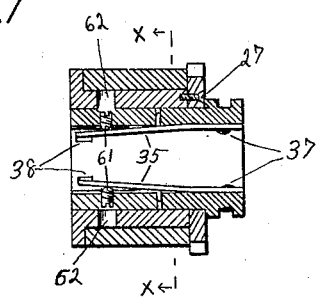

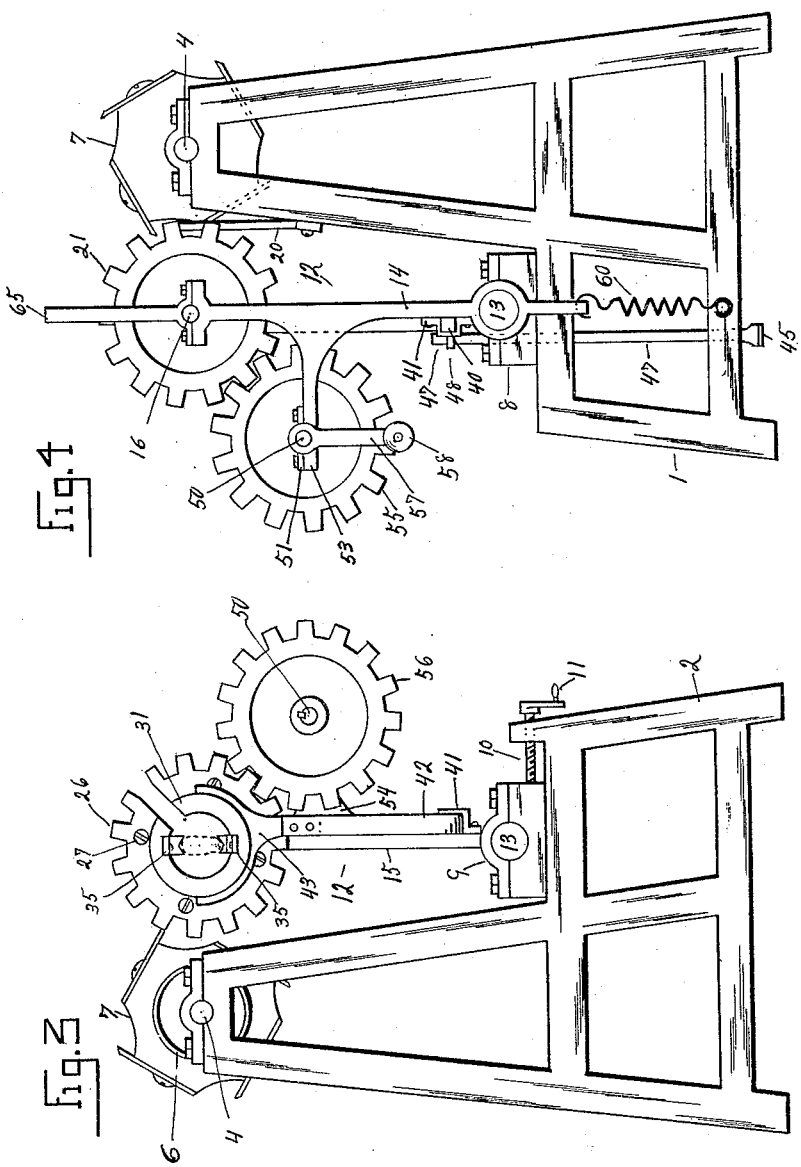

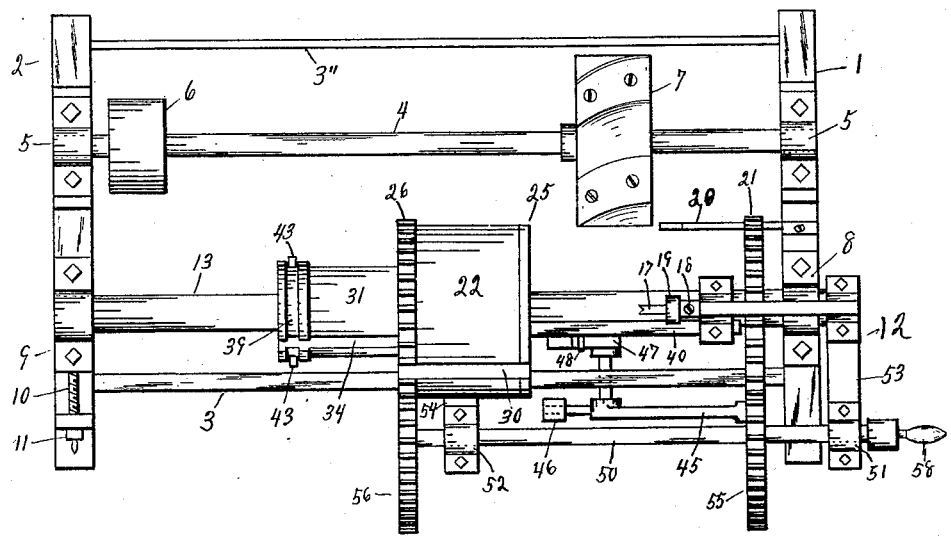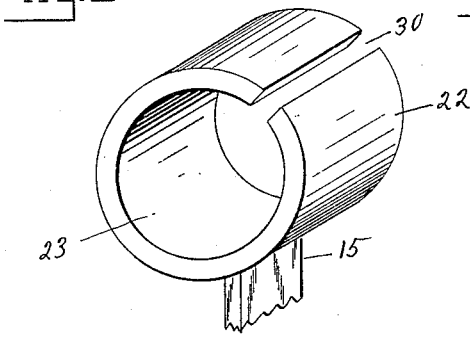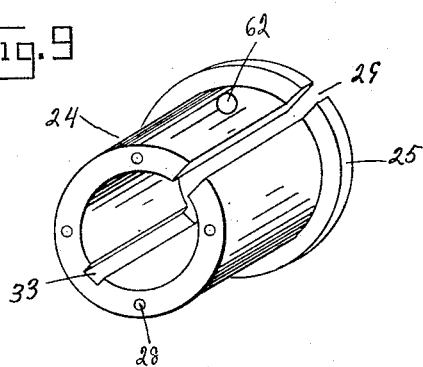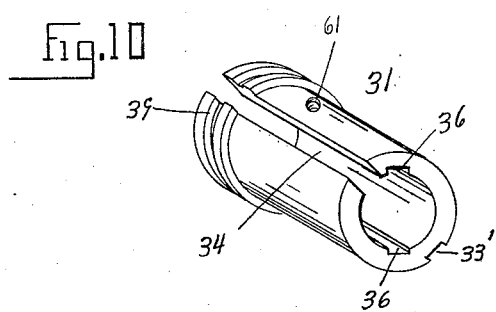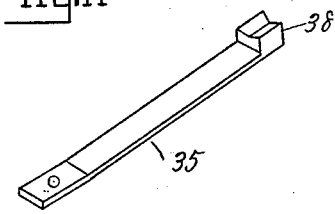

UNITED STATES PATENT OFFICE.

JAMES A. CUMMINS, OF LOUISVILLE, KENTUCKY, ASSIGNOR TO TURNER, DAY & WOOLWORTH HANDLE COMPANY, OF LOUISVILLE, KENTUCKY, A CORPORATION OF KENTUCKY.

SHAPING-MACHINE.

1,113,201. Specification of Letters Patent. Patented Oct. 13, 1914.

Application filed May 16, 1914. Serial No. 838,917.

*To all whom it may concern:*

Be it known that I, JAMES A. CUMMINS, a citizen of the United States, residing at Louisville, in the county of Jefferson and State of Kentucky, have invented certain new and useful Improvements in Shaping-Machines, of which the following is a specification.

This invention relates to shaping machines of the class used for turning irregular objects, with more especial reference to that class used for shaping that end of an ax handle which enters the eye of an ax.

An object to be attained is the production of a machine which may be economically constructed, and which will be readily manipulated.

A further object is the production of a machine of the class described, which comprising a minimum of parts will be durable in service and efficient in operation.

With the foregoing, and other objects in view the invention consists in the novel construction and arrangement of parts illustrated in the accompanying drawings, comprising four sheets, which form a part of this specification, in which is set forth an embodiment of the invention, but it is to be understood that changes, variations and modifications may be resorted to which come within the scope of the claims appended hereunto.

In the drawings, in which like reference numerals indicate similar parts in the several views; Figure 1, is a front elevation of an embodiment of the invention, showing the parts in position for the reception of work; Fig. 2, a rear elevation, showing parts in position assumed when work is clamped in position, work not shown; Figs. 3, and 4, end elevations; Fig. 5, a plan view; Fig. 6, a section on line x—x of Fig. 7; Fig. 7, a central, longitudinal section of the chuck; Fig. 8, a perspective of the chuck stock; Fig. 9, a perspective of the chuck body; Fig. 10, a perspective of the chuck sleeve; Fig. 11, a perspective of one of the chuck jaws; Fig. 12 is a central longitudinal section of the chuck showing a handle loosely laid therein; Fig. 13, a view similar to Fig. 12 showing the handle clamped in position.

The main frame for supporting the operating parts of the machine may be of any suitable character, the one illustrated comprising upright end pieces —1, 2— connected by suitable longitudinal rails —3, 3', 3"—. On an elevated portion of the main frame a shaft —4— is mounted in suitable bearings —5— and carries a driving pulley —6— and a suitable cutter-head —7—. Pillow blocks —8 and 9— are positioned on a lower, forward portion of the main frame, and one of them, as 9, is adapted to be adjusted to and from the elevated part of the frame by means of a screw threaded rod —10—, manipulated by a handle —11—. A swinging frame —12— is mounted on the pillow blocks 8 and 9, said swinging frame comprising a shaft —13—, on which is a head stock —14— and a chuck stock —15—. A spindle —16— is suitably journaled in the head stock and provided on its inner end with an adjustable centering pin —17—, provided with spurs upon which work may be impaled. A set screw —18— is provided for adjusting the pin 17. A cam —19—, secured on the spindle 16, is adapted to be brought against the cam-plate —20—, adjustably secured on the main frame, and serves to govern the position of the swinging frame, and work held therein, relative to the cutter head 7. The cam is removable from the spindle, in order that different forms or sizes of cams may be placed thereon for the different sizes or shapes of handles to be worked on. A gear wheel —21— secured on the spindle 16 provides means of imparting motion thereto. The chuck stock is provided on its upper end with an enlargement —22— having an annular chamber —23— adapted to receive a chuck head —24—, which is retained therein by means of an annular projecting flange —25—, on one end of the head, and a gear wheel —26— secured on the other end thereof by suitable means such as screws —27—, entering tapped holes —28— in the chuck head. The flange 25 bears against one end of the chuck stock 22 and the gear wheel against the other end thereof. The chuck comprises a body, or head 24, rotatably mounted in the chamber 23, and having a longitudinal work receiving slot —29—, normally registering with a corresponding slot —30— opening from the chamber 23, through the wall of the chuck stock.

A sliding sleeve —31— is positioned within the head 24 and connected therewith by means of a spline, or key —32—, fitting in the key-ways —33, 33'—, respectively in the head 24 and sleeve 31. The sleeve is provided with a longitudinal slot —34— which registers with the slot 29 in the head. Spring jaws —35— secured in longitudinal grooves —36—, by suitable means such as screws —37—, are provided at their forward end with gripping projections —38—, the faces of which conform, substantially to the contour of the work to be grasped. It will be observed that the sleeve 31 rotates as a unit with the head 24, but may be freely moved longitudinally therein. The sleeve projects rearwardly from the head 24 and is provided, near the protruding end, with an annular exterior groove —39—. A bar —40— slidably mounted, in bearings —41—, on the face of the swinging frame, has a vertical extension —42— secured to the upper end of which is a yoke-shaped member which engages in the groove 39. A foot lever —45—, suitably fulcrumed in the rail 3, is provided with a vertical arm —47— which extends upward into position to engage with pins —48— on the bar 40, and operate said bar. Suitable means, such as a counter weight —46—, is provided for returning, and normally maintaining, the lever 45, and associated members, in the inoperative position (as shown in Fig. 1). Pressure on the foot lever will, through the medium of the arm 47, bar 40 and yoke 43, cause the sleeve 31 to enter the head 24 (as shown in Fig. 2), and when pressure is relieved the counterweight will cause the sleeve to be retracted. On a shaft —50—, suitably mounted in bearings —51, 52—, secured on brackets —53, 54— which extend respectively from the head stock and chuck stock, are gear wheels —55, 56—. The gear wheels 55, 56 engage respectively with the gear wheel 21 on the spindle 16 in the head stock, and with the gear 26 on the chuck head 24. A crank —57— on the outer end of the shaft 50 provides means whereby the same may be turned. Turning the shaft 50 will through the associated gears 55, 21 and 56, 26 impart a uniform motion to the spindle 16 and chuck head 24. A spring —60— serves to hold the swinging frame normally in a vertical, or inoperative position. The slots 29, 30 and 34 are in alinement when in the inoperative, or work receiving position, and for convenience in inserting work, extend through the respective members at an angle of 45 degrees.

With parts in the position shown in Fig. 1, a workman standing in front of the machine near the forward end, introduces an ax handle, edgewise, through the slots into the interior of the chuck, the forward end of the handle being in proximity to the centering pin 17. With the lower edge of the ax handle on the grip 38, of the lower jaw, (see Fig. 12) the handle is turned to bring its major axis in a vertical plane, pressure is then exerted on the foot lever 45 advancing the sleeve 31 into the chuck. As the sleeve advances the attached spring jaws move along the sloping edges of the ax handle yielding thereto until the limit of their movement is reached, (see Fig. 13) when the ax handle will be advanced with the sleeve and impaled on the spurred pin 17. The amount of movement of the spring jaws may be regulated by means of screws —61—, access to said screws being had through perforations —62— through the wall of the chuck head, the head being turned to bring the perforations into alinement with the slot in the chuck stock when it is desired to adjust the spring jaws. With the ax handle firmly held in the chuck, the workman grasps the hand piece —65—, which extends above the head stock, and swings the frame over to engage the work with the cutter head; then grasping the handle 58 he rotates the work presenting all sides to the action of the cutters, the cam 19 gaging the cut. The frame is then swung forward from the cutter head, pressure removed from the foot lever, when the counter weight withdraws the sleeve from the chuck head releasing the work which may be removed.

It is thought that the construction, operation and advantages of my invention may be understood from the foregoing without more extended description.

Having thus described my invention so that any one versed in the art pertaining thereto may make and use the same, I claim:—

1. A shaping machine comprising a fixed frame, a frame mounted to swing thereon, a cutter head mounted to rotate on the fixed frame, a centering spindle on the swinging frame, a chuck for holding work carried on the swinging frame, said chuck consisting of a rotatable head, a sleeve slidably mounted in said head, said sleeve and head having registering slots for the passage of work, work retaining members within said head adapted to be clamped on work by the advancement of said sleeve, and manipulative means for sliding said sleeve.

2. In a shaping machine, a cutter head in combination with work holding means comprising a spindle and a chuck, said chuck consisting of a chuck-casing, a rotative head therein, a sliding sleeve in the head, said casing, head and sleeve having registering slots for the passage of work, work clamping members within the sleeve and manipulative means for sliding said sleeve.

3. In a shaping machine, a cutter head in combination with work holding means comprising a spindle and a chuck, said chuck consisting of a casing, a rotative head mounted therein, a sliding sleeve in the head, said casing, head and sleeve having coinciding longitudinal slots for the passage of work, work clamping members within the sleeve, means for shifting said sleeve and means for simultaneously rotating said spindle and sleeve.

4. A shaping machine comprising a fixed frame, a frame mounted to swing thereon, a cutter head mounted to rotate on the fixed frame, a centering spindle mounted in the swinging frame, a chuck for holding work carried on the swinging frame, said chuck consisting of a rotatable head, a sliding sleeve in the head, said head and sleeve having coincident slots for the passage of work, work retaining members within the sleeve, a lever on the fixed frame operatively connected with and adapted to advance the sliding sleeve to clamp work between the retaining members, and means for rotating said spindle and chuck.

5. In a shaping machine, a chuck comprising a casing, a head rotatively mounted therein, a sleeve slidably mounted in said head, resilient work clamping members within said sleeve, coinciding slots in said casing, head and sleeve for the passage of work, manipulative means in engagement with said sleeve for actuating same.

6. In a shaping machine, a chuck comprising a rotatable head having a longitudinal slot for the passage of work, a sliding sleeve within said head having a slot registering with said first named slot, resilient work retaining members in said sleeve and means for actuating said sleeve to clamp work between said retaining members.

7. In a shaping machine, a chuck comprising a rotatable head having a longitudinal slot for the passage of work, a sliding sleeve mounted in said head and extending therefrom, manipulative means engaged with said extended portion, a slot in said sleeve registering with the first named slot and work retaining means within said sleeve adapted to grip work placed therein when said sleeve is advanced.

8. A shaping machine comprising a fixed frame, a swinging frame mounted thereon, a chuck on the swinging frame, a sliding sleeve in said chuck, work retaining means within the sleeve adapted to grip work when said sleeve is advanced, a sliding bar on the swinging frame, said bar connected with said sleeve, a foot-lever on the fixed frame in connection with said bar and means for rotating said chuck.

JAMES A. CUMMINS.

Witnesses:
CHRIS. D. GATES,
M. BLUMMELL.

Copies of this patent may be obtained for five cents each, by addressing the "Commissioner of Patents, Washington, D. C."